United States Patent [19]
Tavelle et al.

[11] 3,941,635
[45] Mar. 2, 1976

[54] METHOD OF SEALING THE END OF A SLEEVED ROLL

[75] Inventors: Charles L. Tavelle, North Charleston, S.C.; Robert F. Wittschen, Houston, Tex.

[73] Assignee: Raybestos-Manhattan Inc., Trumbull, Conn.

[22] Filed: Aug. 28, 1974

[21] Appl. No.: 501,176

[52] U.S. Cl. ............... 156/86; 29/123; 29/130; 156/267; 156/294; 264/230; 428/913; 29/132; 29/148.4 D; 156/303.1
[51] Int. Cl.² .............. B29C 27/00; B32B 31/00
[58] Field of Search .......... 156/69, 84, 85, 86, 156, 156/213, 293, 294, 215, 244, 245, 267, 289, 500, 298, 303.1; 425/110, 113, 117, 403, 468; 29/148.4 D, 110, 123, 130, 132; 264/230, DIG. 71, 262; 101/329, 348; 53/305; 428/913

[56] References Cited
UNITED STATES PATENTS

| | | | |
|---|---|---|---|
| 2,444,880 | 7/1948 | Robinson | 29/123 |
| 2,741,014 | 4/1956 | Hubbard | 29/130 |
| 2,989,785 | 6/1961 | Stahl | 156/69 |
| 3,389,749 | 6/1968 | Towns et al. | 156/245 |
| 3,435,500 | 4/1969 | Aser et al. | 156/86 |
| 3,640,218 | 2/1972 | Allison | 29/123 |
| 3,816,206 | 6/1974 | Coster | 156/244 |

*Primary Examiner*—William A. Powell
*Assistant Examiner*—J. J. Gallagher

[57] ABSTRACT

A method is provided for sealing the end of a sleeved roll comprising a roll-shaped body and a tubular sleeve-shaped lamina formed of a thermoplastic synthetic resinous release material coaxially disposed about the body, the lamina having a heat-shrinkable end extending substantially beyond the body. A synthetic elastomeric sealant is applied between the lamina end and the body end, and the lamina end is then heat-shrunk to compress the lamina end about the sealant and the body end and to bondingly engage the sealant to the lamina end and the body end, thereby sealing the body end. Preferably the body has a bevel on its outer edge and the sealant is applied over both the body end and the bevel prior to heat shrinking.

19 Claims, 8 Drawing Figures

METHOD OF SEALING THE END OF A SLEEVED ROLL

BACKGROUND OF THE INVENTION

Rubber rolls have found widespread use in a wide variety of applications. Processing rolls used in the textile industry, printing rolls used for press printing (i.e. ink transfer rolls), and fuser rolls in xerography copiers are all examples of the specific applications for rolls of the type herein described. Such rolls generally comprise an annular cylinder of elastomeric material such as silicone rubber, with a metal core typically being coaxially disposed within the roll for support. In all of these applications it is highly desirable to provide a jacket or sleeve around the outside surface of the rubber rolls in order to provide a low coefficient of friction so that resistance to the rotation of the roll in an adjacent surface is reduced. For this purpose, the sleeve is provided with a smooth outer surface and in addition, it is generally flexible so that the resilient character of the rubber will not be adversely affected during the operation of the roll. Fluorocarbon materials are quite suitable as a sleeve material, and are therefore often used. More specifically, polytetrafluoroethylene, which is commonly known as Teflon (registered trademark of Du Pont Corporation), and polytrifluorochloroethylene are examples of fluorocarbon sleeves which are frequently used.

Method and apparatus for manufacturing such sleeved rolls have been described in numerous patents assigned to the assignee of the present invention, including U.S. Pat. Nos. 3,380,120; 3,481,805; 3,607,494; 3,613,168; and 3,647,336. In particular, U.S. Pat. No. 3,613,168 describes a method of procuding a cored rubber roll while simultaneously placing a thin flexible sleeve thereon comprising: etching the inner surface of the sleeve, placing the sleeve into a mold casing and around a core member positioned in a casing, supporting the sleeve so as to provide a space between the core member and the sleeve, feeding rubber into the space between the core member and the sleeve, applying pressure to the rubber while feeding it into the space to thereby cause the rubber to accumulate and expand the sleeve against the inside of the mold casing, and continuing to feed the rubber into the spacing until all of the available space is filled between the core and the sleeve, thereby to fully expand the sleeve against the inside casing along substantially the entire length of the sleeve. In the preferred embodiment of the invention, the rubber is passed into the space from a number of directions so as to expand the sleeve substantially simultaneously in all directions. For this purpose the mold assembly is provided with end sections which include a plurality of small circular holes through which the rubber is passed in a plurality of streams. The holes are smaller than the space into which the rubber passes and as a result the pressurized rubber accumulates in the space near the holes and begins to expand the sleeve. After the sleeve in a particular area is expanded by the rubber against the inside mold casing, the continued passage of rubber into the same area causes the rubber to slowly travel along the axial length of the space between sleeve and core member with the consequent further periodic accumulation of the rubber and expansion of the sleeve. The process is continued until the rubber fills substantially all of the available space between the core and the sleeve. In this manner not only is the rubber formed about the core with precise dimensions but the sleeve is also simultaneously bonded to the rubber as it is pressed by the rubber under great pressure against the inside surface of the casing. After the rubber has filled the available space, the entire mold is removed and may then be placed in an oven and processed to a temperature at which the rubber is vulcanized. Thereafter, the assembly of core, rubber roll and sleeve is withdrawn from the mold and may be slowly heated to approximately 400° F. for the purposes of driving off excess gases that may have been trapped within the rubber, if desired.

In certain applications these sleeved rolls are utilized in an environment containing chemicals which will cause deterioration of the rubber within the sleeved roll and thus adversely affect the longevity of the roll. For example, the fuser rolls used in xerography copiers are exposed to an oil (called fuser oil) which attacks silicone rubber and would greatly reduce the longevity of the fuser roll if means were not provided for protecting the silicone rubber thereof from the fuser oil. Fortunately, the cylindrical working surface of the rubber roll is easly protected from direct radial exposure to the fuser oil by selecting an appropriately oil-impervious fluorocarbon sleeve such as Teflon. The real problem has been to protect the rubber roll from fuser oil entering through the ends of the fuser roll and laterally attacking the silicone rubber.

The end of the fuser roll appears as a laminate of an inner metal core, an intermediate rubber body, and an outer fluorocarbon sleeve, the latter typically extending inwardly to some degree over the exposed end of the rubber body. The ends of the rubber body have heretofore been protected from the fuser oil to some degree by the application thereto of an oil-impervious sealer, such as a special room temperature vulcanizable elastomeric material of fluorosilicon rubber hereinafter referred to as "RTV" and available from Dow Corning under the designation of "DC 236 Dispersion". The sealant is applied to the rubber body end in such a manner as to cover the entire exposed end surface of the rubber body, and overlap the adjacent end portions of the fluorocarbon sleeve and metal core, thereby hopefully to seal the end of the rubber body between the sleeve, core and sealant. Unfortunately while the RTV sealant bonds in a fairly satisfactory manner to the rubber body and to the metal core and thus precludes the intrusion of fuser oil through the end of the rubber body and between the outer surface of the metal core and the inner surface of the rubber body, it does not bond as well to the Teflon sleeve. The latter eventually breaks away from the sealant after a period of use and permits intrusion of fuser oil between the inner surface of the sleeve and the outer surface of the rubber body.

To combat migration of the fuser oil between the sleeve and rubber body, the fuser rolls are often provided with ends having beveled outer edges wherein the inner surface of the sleeve is tightly pressed against the outer surface of the rubber edge to block the migration path. For example, in the process disclosed in U.S. Pat. No. 3,481,805, wherein heat shrinkable plastic sleeve is heat-shrunk about a rubber roll to bond the sleeve thereto, the heating is prolonged at each end of the roll to cause additional shrinkage of the sleeve ends so that a bevel is formed at the outer edge of the roll end. Similarly, in the process disclosed in U.S. Pat. No. 3,613,168, wherein rubber is injected between a metal core and an expandable plastic sleeve to radially expand the sleeve and bond the rubber to both core and sleeve, each end of the sleeve is maintained at its original diameter as the intermediate length of the sleeve is radially expanded so that a bevel is formed at the outer edge of the roll end. Nonetheless, experience has shown that once even a slight gap arises at the sleeve/sealant interface at the roll end, the fuser oil will intrude through this gap and in time work its way through the sleeve/roll interface at the bevel.

As improvements in the materials and manufacturing techniques for making these sleeved rolls have improved, the problem of effectively sealing the sleeved roll ends has become more important; in fact the critical factor determining the longevity of the currently available fuser rolls is presently the effective life of the end seal. To fully appreciate the magnitude of the problem, it must be recognized that when the sleeve is composed of a "release" material such as Teflon, only the inner surface of the sleeve end is truly available for bonding, as it is only the inner surface of the sleeve which has been etched to permit bonding. Furthermore, it must be recognized that it is characteristic of an injection molded sleeved roll (for example, one manufactured by the process described in U.S. Pat. No. 3,613,168) that the ends of the roll are of slightly greater diameter than the intermediate length of the roll. As a result, these roll ends are subjected to great flexing during use, and hence the likelihood of sleeve/sealant separation at the roll ends is extremely high.

Accordingly, it is an object of the present invention to provide a sleeved roll with an improved end seal.

It is another object to provide such a sleeved roll wherein the ends of the rubber body are protected against attack by harmful fluid by use of a sealant.

It is a further object to provide such a sleeve roll wherein the rubber body is protected from attack even after harmful fluid has migrated between the sealant and the sleeve.

SUMMARY OF THE INVENTION

It has now been discovered that the above and related objects may be obtained by providing a sleeved roller comprising a roller-shaped body having an end, and a substantially tubular lamina coaxially disposed about the body having a heat-shrinkable end of thermoplastic material extending substantially beyond the body end. A synthetic elastomeric sealant is then applied over at least a portion of the body end and between the lamina end and the body end. Finally, the lamina end is heat-shrunk to compress the lamina end about the sealant and the body and to bondingly engage the sealant to the lamina end and the body end, thereby sealing the body end.

In a preferred embodiment, the lamina is formed of a fluorocarbon, the sealant is a room temperature vulcanizable fluorosilicon rubber, and the body has an outer surface formed of silicone rubber. Preferably, the body end has an arcuately beveled outer edge. Where the lamina end has an inner diameter $D'$ prior to heat-shrinking and an inner diameter $D$ after heat-shrinking, the body edge defines an arc having a radius $R$ which is preferably substantially equal to one-half the difference in inner diameters $D'$ and $D$ of the lamina end; i.e., $R=0.5(D'-D)$. The lamina end extends from the body end at least a length L substantially equal to $0.5\pi R$ prior to heat-shrinking; i.e., $L \geq 0.5\pi R$. If the length of the lamina end extending beyond the body end (i.e., from its last bonded point of contact with the body end) exceeds the arcuate length of the body edge, it may be reduced to a length substantially equal to the arcuate length prior to applying the sealant so that the lamina end becomes embedded within the sealant during heat-shrinking.

In certain instances it may also be desirable to etch the inner surface of the lamina end prior to applying the sealant. Heat-shrinking the lamina end typically expels a quantity of the sealant from between the lamina end and the body end, and the portion of the sealant extending outwardly beyond the outer surface of the heat-shrunk lamina end may be trimmed from the sealed body end after heat shrinking.

Generally the sealant is applied to the entire exposed surface of the body end and the body edge. Where the body has an inner core of circular cross-section coaxially disposed therewithin, the core having an end extending beyond the body end, the sealant is applied onto the entire surface of the body end between the core end and the lamina end. In a typical roll situation the body and the lamina each have second ends, the second lamina end extending substantially beyond the second body end. In this case the sealant is also applied between the second lamina end and the second body end, and the second lamina end is also heat-shrunk about the second body end to seal the second body end.

The process seals the end of a sleeved roller in such a manner as to force attacking fluid to travel a bevel of quarter circumference length through a sealant/sleeve interface of exceptional tightness. Rolls having ends sealed according to the process of the present invention exhibit an operational life of three, and even four, times longer than rolls having conventional end seals permitting attacking fluids to travel along a loose rubber body/sleeve interface.

DETAILED DESCRIPTION OF THE PREFERRED EMBODIMENTS

Figure 1:
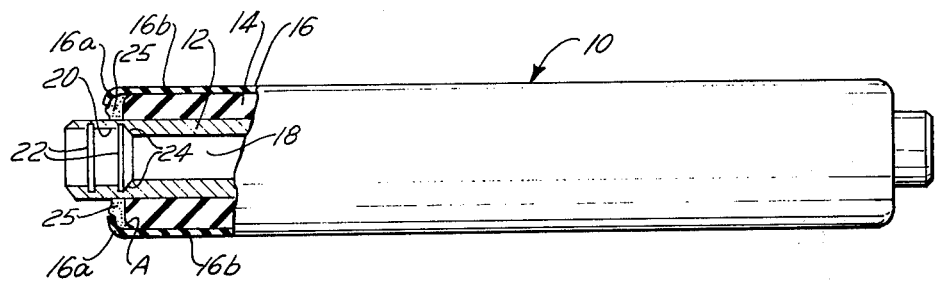
FIG. 1 is a side view, partially in section, of one example of a cored and sleeved roll manufactured by the process of the present invention.

Referring to the drawings and specifically to FIG. 1, there is shown a roll generally designated by the numeral 10 comprising a metal core 12, a rubber body 14, and a thin flexible sleeve 16 completely enclosing body 14 except for the ends thereto. The core 12 is hollow as indicated at 18, and the ends are counterbored to a larger diameter as shown at 20 for the purposes of receiving anti-friction bearings such as ball or roller bearings. The bearings may be held in position axially by means of snap rings which may be received in the annular grooves 22. The tapers 24 which are formed at the counterbored opening 20 are utilized for the purposes of centering the core in the mold assembly as further explained hereinafter. The sleeve 16 has ends 16a and an intermediate length 16b therebetween. It is preferably composed of a fluorocarbon material such as Teflon, but may be composed of any equivalent material such as thermoplastic and expandable synthetic resin, preferably a plastic having "release" or non-stick properties. The rubber 14 may be composed of an elastomer including rubber compounds and many synthetics such as neoprene, silicone and the like. The preferred material for use in the roll is silicon rubber. A silicon resin adhesive may be placed between the rubber 14 and the core 12 in order to ensure a proper bond between these two members, but it is preferably not included between the rubber 14 and the sleeve 16 since it is not necessary for a proper bond between these components when the process of the invention is carried out.

Each end of the rubber body 14 has at its outer edge an arcuate bevel indicated by the letter A. An elastomeric sealant 25 such as RTV covers the exposed end of rubber body 14 and extends outwardly over the bevel A and inwardly onto the core 12. The sleeve end 16a passes over the sealant at bevel A and terminates in an edge which is embedded within the sealant 25 at a point radially inward from the bevel A. Prior to the formation of the sleeved roll 10, a tubular length of sleeve material having an inner diameter D is trimmed to a suitable length for the particular roll 10 being produced. The entire inner surface of the sleeve 16 is etched to enable a relatively strong bond to be formed between the sleeve 16 and the rubber body 14 without the use of intermediate bonding material. The etch may be performed by any of the well known processes currently employed (for example, with a solution of ammonia and sodium) and, if desired, may be followed by application of a conventional primer to further enhance bondability.

Each sleeve end 16a is then radially expanded to an inner diameter D which is at least as large as the inner diameter of the intermediate sleeve length 16b in the finished product (that is, after the diameter of the intermediate sleeve length 16b has been expanded by the injection of rubber as hereinafter described), aad preferably of substantially the same inner diameter. The sleeve ends 16a may be expanded with or without the application of heat thereto, so long as the expanded sleeve ends 16a retain a memory of their initial size (diameter D) and will attempt to return thereto upon subsequent heating. A preferred method for expanding a sleeve end 16a consists of heating the sleeve end 16a to a temperature of about 300° F to about 400° F, then forcing the hot sleeve end 16a over a form of predetermined configuration and size, and then permitting the sleeve end 16a to cool on the form prior to removal therefrom. Once the cooled sleeve ends 16a is removed from the form, it is ready for insertion in the mold apparatus used to form the roll 10.

Figure 2:
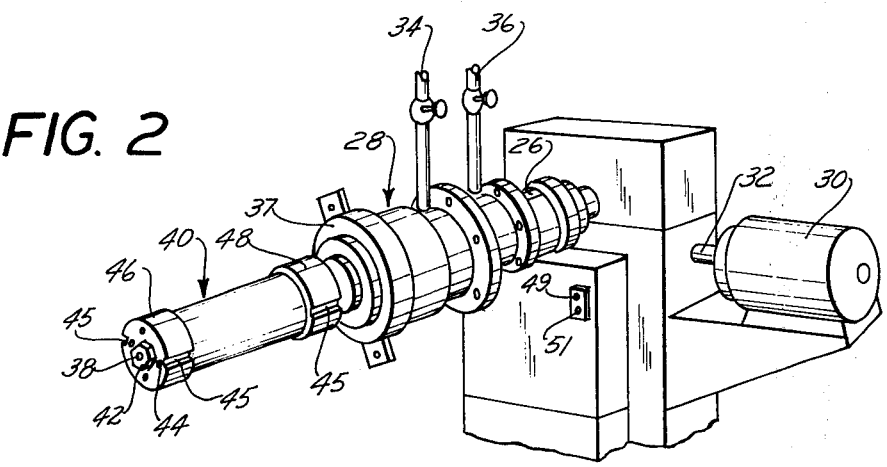
FIG. 2 is a fragmentary perspective view showing an apparatus which may be employed in the formation of the roll of FIG. 1.
Figure 4:
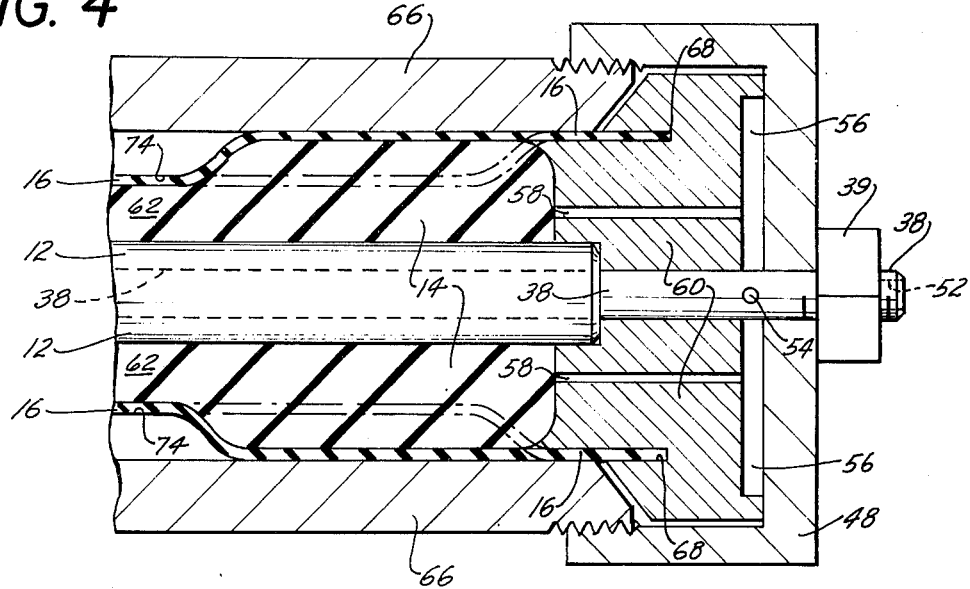
FIG. 4 is a fragmentary longitudinal section similar to FIG. 3, after placement of the core and injection of some rubber, the original configuration of the sleeve being indicated in phantom line.

The sleeved roll 10 illustrated in FIG. 1 is produced in an apparatus such as that shown in the perspective illustration of FIG. 2. As there shown the rubber is passed into the hopper opening 26 of a screw type extruder generally designated by the numeral 28. This extruder may be of any of the well known conventional types and is driven by an electric motor 30 through shaft 32. The extruder chamber is provided with an enclosure and may be heated or cooled as required by means of a heated or cooled fluid which is passed to the interior of the enclosure through pipes 34 and 36. A spindle 38, best shown in FIG. 4, is integrally attached to the discharge end of the extruder 28 by means of internally threaded adapter 37 and lock nut 39. The spindle serves to removably mount mold assembly generally designated by the numeral 40 in position adjacent the extruder 28. As illustrated in FIG. 2 the mold 40 is mounted over the spindle 38 and is held in place by a holding nut 42. A plurality of holes 44 are positioned at one end of the mold assembly 40 in discharge end cap 46 and indicate to the operator when the mold is filled with rubber, since when it is filled the rubber passes through the holes 44. When this occurs the mold assembly 40 is removed from the extruder 28 and is replaced by another mold assembly. An entry end cap 48 is positioned opposite discharge end cap 46 on mold 40 and each end cap 46, 48 is provided with a pair of slots 45 to receive a spanner wrench for tightening the same when assembling the mold, and for removing the same when opening the mold to withdraw the roll therefrom. The extruder is operated by "start" and "stop" means shown as buttons 49 and 51.

Figure 3:
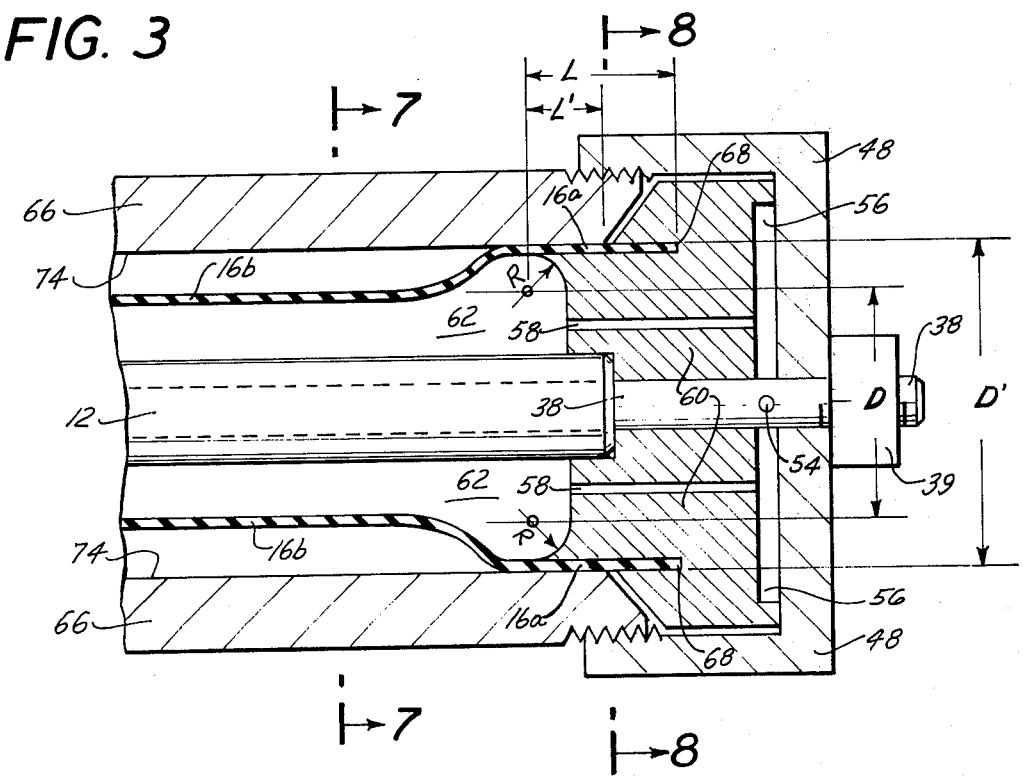
FIG. 3 is a fragmentary longitudinal section of the mold portion of the apparatus illustrated in FIG. 2, showing placement of the sleeve within the mold prior to injection of any rubber.

FIGS. 3–4 illustrate the various components which are included in the mold assembly 40, FIG. 3 illustrating the components prior to injection of the rubber and FIG. 4 illustrating the components after injection of some, but not all, of the rubber. As illustrated in FIG. 2 spindle 38 is shown passing through the core 12 and being held in position at the end of the mold by the holding nut 42, the spindle 38 being end threaded to receive the holding nut. At the entry end of the assembly 40 the spindle 38 is provided with a counterbore 52 into which the rubber from the extruder 28 passes as it is discharged from the extruder through a channel in adapter 37. Four radial holes 54 are positioned about the spindle 38 and serve to assist the passage of the rubber from the counterbore 52 into the entrance opening 56. Since the extruder 28 and the spindle 38 are rotating during the operation of the system, the rubber is passed from the counterbore area 52 of the spindle 38 into the entrance opening 56 at a high pressure. The rubber then passes through a plurality of small holes 58 which are positioned in the entry end part 60 into space 62. Since the holes 58 are small in diameter, the rubber passes into the space 62 under very high pressure. The thin flexible sleeve 16 is mounted within the mold assembly between the casing 66 and the core 12. One expanded sleeve end 16a is held at the entry end in a groove 68 which is formed in the entry end part 60, and the other expanded end 16a is similarly held in a groove which is formed in the discharge end part (not shown). The grooves in both end parts are substantially axially aligned so as to provide a substantially equal spacing between the intermediate sleeve length 16b and the core 12. As the rubber passes into the space 62 from the small holes 58 it accumulates within the space 62 near the holes 58. The accumulation continues until the intermediate sleeve length 16b is expanded against the inside surface 74 of the casing 66. Due to the pressure under which the rubber is continuously passed into the space 62, the accumulated rubber is caused to move along the surface of the core member 12, and while so moving, to continue to drive against the inside surface 74 of the casing 66. This operation is best illustrated in FIG. 4, where the rubber is shown after it has partially traversed the path along the space 62. Rubber is continuously passed into the space 62 through the holes 58 until all of the space 62 is filled with the rubber. In this manner the sleeve 16 is driven against the inside wall 74 of the casing 66 over its entire length, and due to the extreme force of the rubber, the intermediate sleeve length 16b adheres to the rubber and is bonded thereto without the use of a bonding material. Detection of the completion of the process occurs when the rubber passes through the venting holes 44 in the discharge end cap 46.

At this point the operator stops the extruder, removes the mold assembly 40 from the spindle 38, and replaces it with another mold assembly.

As shown in FIG. 4, the counterbored section 52 of the spindle 38 is in communication with a plurality of radial holes 54 which assist in the dispersion of the rubber as above explained. The holes 58 are placed about the periphery of the entry end part 60 and include in the embodiment here illustrated 15 small holes, preferably at a diameter of about 1/16 of an inch. Best results are achieved when these holes are small in size, the diameter being preferably about one-half of the width of space 62 or less, since a high pressure is ensured. It has been determined that a desirable pressure under which the rubber is forced into the area between the sleeve and the core is at least 1000 psi, but lower pressures are also suitable provided that sufficient pressure on the sleeve is effected. This particular pressure is readily achieved by employing the configuration of holes 58 illustrated in the drawings. Other equipment however may be used to obtain the desired pressure and is considered within the scope of this invention. The holes 58 should not be so small as to prevent the free flow of the rubber or to retard the flow to the extent that long processing times are required. The small diamter of the holes has the additional advantage of retaining the charge of rubber under considerable pressure after the mold has been removed from the extruder and during subsequent curing, if employed. It will be noted that with fifteen such holes the rubber is fed into the space 64 in a plurality of streams thus enabling the expansion of the sleeve to take place in all directions substantially simultaneously. Thus, wrinkles and other defects which would render the sleeve unusable are avoided.

The groove 68 is also circular and is substantially concentric with the core 12 and the inside wall 74 of the casing 66. The groove 68 should be of a width which is large enough to receive the sleeve without difficulty but should not be so large as to permit the sleeve to shift position during the process. For a Teflon sleeve of about 0.010 inch to about 0.020 inch, a groove width of about 0.030 inch has been successfuly employed to obtain a roll characterized by a smooth, wrinkle-free sleeve. The groove depth must be sufficient to maintain expanded sleeve ends 16a in contact with the end parts 60 during the expansion of the intermediate sleeve length 16b.

The space 62 between core 12 and the intermediate sleeve length 16b may be of any suitable width dimension and has generally been about ⅛ inch in practice, as for example, with a core outside diameter of 1¾ inch and a sleeve inside diameter of 2 inches. The space between the inside wall 74 of the casing 66 and the intermediate length of sleeve 16 depends in part upon the ability of the sleeve material to be expanded from diameter D to diameter D' without rupture, and Teflon has been found to be an acceptable material for expansions of up to 30 percent or more of its diameter. Thus the space between the outside surface of the intermediate length of sleeve 16 and the wall 74 of the casing 66 may be a width of about one-sixth of the diameter of the Teflon sleeve.

At this point it should be noted that the curvature of the bevel A on the end of rubber body 14 after the molding process is determined by the curvature of the abutting face of the part 60 during the molding process. It has been found that the preferred radius R of the bevel A (see FIG. 3) is approximately one half of the difference of the diameters of the intermediate sleeve length 16b in its normal and expanded states. In other words, $$R \cong 0.5 \, (D' - D).$$

After the molding process the sleeve end 16a has a length L (see FIG. 3) greater than one quarter of the circumference of a circle of radius R and preferably substantially greater so that the sleeve end 16a extends substantially beyond the end of the rubber body 14 and into the depths of grooves 68 of the end parts 60 during the molding process.

After the roll 10 has been formed, as earlier described in connection with FIGS. 2–4, the mold assembly 40 is removed from the spindle 38, the nut 42 removed, and the end caps 46 and 48 separated from the casing 66 to enable removal of the sleeved and cored roll 10.

Figure 5:
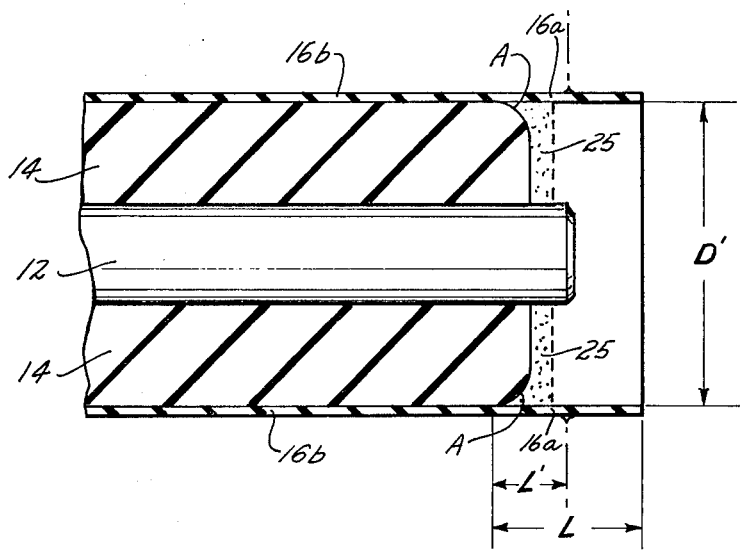
FIG. 5 is a fragmentary longitudinal section of the roll of FIG. 4 after removal of the roll from the mold and the application of sealant to the end thereof.

Referring now to FIG. 5, the sleeve ends 16a are then trimmed to a length L' which preferably is not less than one quarter of the circumference of a circle of radius R so that the sleeve end 16a is of sufficient length to completely cover the bevel A after heat-shrinking. In other words.

$$L' \geq 0.25 \, \pi \, (D' - D) \quad \text{or} \geq 0.5 \, \pi \, R.$$

As it is generally desirable that the edge of the sleeve end 16a becomes embedded within the sealant 25, it is likewise preferred that the sleeve end length L' should be sufficient to permit the sleeve end 16a to extend only partially over the end surface of the rubber body 14; that is, beyond bevel A but not as far as metal core 12. Still with reference to FIG. 5, sealant 25 is then applied over the end surface of the rubber body 14 and extending both onto bevel A and onto core 12. The sealant 25 may be applied using a hand, a brush, or by any other conventional techniques, with care being taken to insure that the sealant 25 covers as much of the full length of the bevel A as is practicable.

Figure 6:
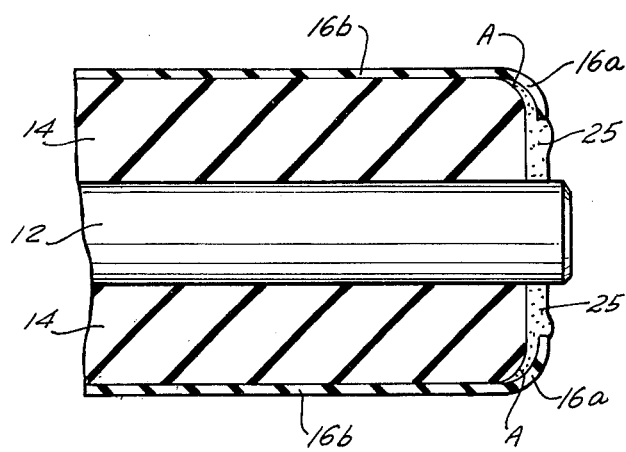
FIG. 6 is a fragmentary longitudinal section of the roll of FIG. 5, after the ends of the sleeve have been trimmed and heat-shrunk.
Figure 7:
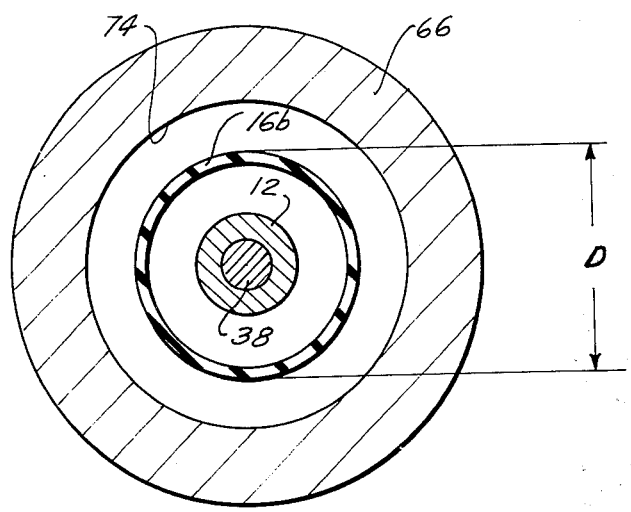
FIG. 7 is a transverse section of the mold portion of the apparatus of FIG. 3 taken along the line 7—7 thereof.
Figure 8:
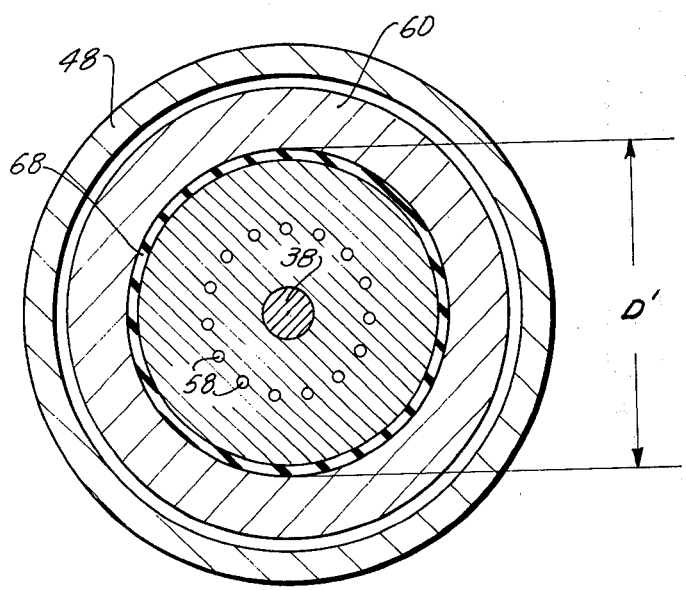
FIG. 8 is a transverse section of the mold apparatus of FIG. 3 taken along the line 8—8 thereof.

Referring now to FIG. 6, once the sealant 25 has been applied, the ends of the roll 10 are heated to a temperature sufficient to cause heat-shrinkage of sleeve ends 16a. Generally heating of a sleeve end 16a to a temperature of about 200° to about 300° F for from about 5 to about 10 minutes will suffice to cause the sleeve end 16a to attempt to return to its original diameter D, although the specific temperatures and times will naturally vary with different sleeve materials. In the shrinking process, the sleeve end 16a will curl inwardly and force some of the sealant 25 away from bevel A, but a sufficient quantity of sealant 25 will remain thereon to effect a tight seal, on one side to the rubber body 14 and on the other side to the inner surface of sleeve end 16a. As the sleeve end 16a continues to shrink and curl, the edge thereof will imbed itself into the body of sealant 25 on the end surface of the rubber body 14. A certain amount of the sealant 25 may be driven longitudinally outwardly of the curled sleeve end 16a, and this flash may be left in place, or for esthetic reasons either scraped away prior to cure of the sealant or ground down after cure of the sealant. The force exerted by the shrinking sleeve end 16a is sufficient to cause bonding of the sealant in the area of bevel A both to the rubber body 14 and the sleeve end 16a itself. Because the sealant 25 over the bevel A blocks the typical migration on path of the fuser oil, the end of the sleeve roll 10 is effectively sealed against attack by the fuser oil. Even if the edge of the sleeve end 16a should separate from the sealant 25, the fuser oil must still travel the full length of bevel A (a full one quarter of the circumference of a circle of radius R) through an extremely tight fitting sleeve/sealant interface before it can attack the rubber body 14.

It will be noted that once the sleeve ends 16a have been trimmed and the sealant 25 applied, the entire roll 10 and not just the ends thereof may be placed in an oven to be heated to a vulcanization temperature of from about 220° F to about 450° F to simultaneously effect vulcanization of the rubber and heat-shrinkage of the sleeve ends 16a. After vulcanization, the rubber may be cured for several hours at a temperature of about 400° F to drive off any trapped gases from the rubber. Naturally the vulcanization and cure temperatures will vary with the specific rubber involved.

In some cases it may be found desirable to clean, re-etch and re-prime the inner surface of the sleeve end 16a immediately prior to application of the sealant 25 to improve the quality of the sealant/sleeve bond; however, this is generally not required.

While the apparatus and process for forming a sleeved roll for use in the instant process have been described above, such apparatus and process are not part of the present invention and other apparatus and processes may be utilized to provide sealant between the bevel of the rubber body and a heat-shrunk sleeve end. All that is required is that the roller-shaped body of circular cross section have a bevel of approximate radius R at the outer edge thereof and that the substantially tubular lamina coaxially disposed about the body has a heat-shrinkable end of thermoplastic material extending at least the length L' beyond the body end. For example, U.S. Pat. No. 3,481,805 describes a method and apparatus for heat shrinking a plastic sleeve on a preformed metal cored rubber roll. By use of a plastic sleeve of suitable length, the process of the present invention can be performed, within the framework of the patented process, simply by applying a synthetic elastomeric sealant over the rubber roll end and between the rubber roll end and the sleeve end, optionally trimming the sleeve end to an appropriate length, and heat-shrinking the sleeve end as part of the described process for heat-shrinking the entire sleeve. The extension of the sleeve end beyond the end of the rubber roll will enable the sleeve end to curl inwardly and form a bevel on the outer edge of the rubber roll, with sealant becoming trapped between the sleeve end and the bevel in the desired position for blocking the migration path of attacking fluids. (This assumes, as would normally be the case, that the sleeve end is heat-shrinkable, in the absence of resistance thereto, to a diameter somewhat less than that to which the intermediate sleeve length is shrunk, further heat-shrinking of the intermediate sleeve length being precluded by the resistance afforded by the rubber roll.) Preferably, the preformed rubber roll will have a suitable bevel at its outer edge prior to application of the plastic sleeve, so that the sealant can more precisely be applied over the surface of the bevel prior to heat shrinking.

To summarize, it can be seen from the foregoing detailed specification that a process has been described for sealing the ends of a sleeved roller in such a manner as to force attacking fluid to travel a bevel of quarter-circumference length through a sealant/sleeve interface of exceptional tightness. Rolls having ends sealed according to the process of the present invention exhibit an operational life of three, and even four, times longer than rolls having conventional end seals permitting attacking fluids to travel along a loose rubber body/sleeve interface.

Now that the preferred embodiments of the present invention have been shown and described in detail, various modifications and improvements thereon will become readily apparent to those skilled in the art. Accordingly, the spirit and scope of the present invention is to be considered as defined only by the appended claims, and not by the foregoing disclosure.

We claim:

1. A method of sealing an end of a sleeved roller comprising the steps of:
    a. providing a sleeved roller comprising (i) a roller-shaped body having a peripheral outer surface and an end defining a beveled outer edge continuous and unitary with said surface, and (ii) a substantially tubular lamina coaxially disposed about said body having a heat-shrinkable end of thermoplastic material extending substantially beyond said body end;
    b. applying a mass of synthetic elastomeric sealant over said body edge and between said lamina end and said body end; and
    c. heat-shrinking said lamina end to compress said lamina end about said sealant and said body to imbed said lamina end in said sealant mass and to bondingly engage said sealant to said lamina end and said body end, thereby sealing said body end.

2. The method of claim 1 wherein said body edge defines an arc of radius R, and said lamina end extends from said body end at least a length of substantially $0.5\pi R$ prior to heat-shrinking in step (c).

3. The method of claim 1 wherein said lamina end has an inner diameter D' prior to heat-shrinking and is heatshrunk to an inner diameter D in step (c), and wherein said body edge defines an arc having a radius substantially equal to one-half the difference in inner diameters D' and D of said lamina end.

4. The method of claim 1 including the step of reducing the length of said lamina end extending from said body end prior to heat shrinking in step (c).

5. The method of claim 1 wherein the length of said lamina end extending beyond said body end exceeds the arcuate length of said body edge and is reduced to a length substantially equal to said arcuate length prior to applying said sealant in step (b), whereby said lamina end becomes embedded within said sealant during heat-shrinking in step (c).

6. The method of claim 1 including the step of etching the inner surface of said lamina end prior to applying said sealant in step (b).

7. The method of claim 1 wherein heat-shrinking said lamina end in step (c) expels a quantity of said sealant from between said lamina end and said body end, and including the step of trimming from said sealed body end after step (c) the portion of said sealant extending outwardly beyond the outer surface of said heat-shrunk lamina end.

8. The method of claim 1 wherein said lamina is formed of a fluorocarbon.

9. The method of claim 1 wherein said sealant is a room temperature vulcanizable fluorosilicon rubber.

10. The method of claim 1 wherein said body has an outer surface formed of silicone rubber.

11. The method of claim 1 wherein said body end defines an arcuately beveled outer edge.

12. The method of claim 1 wherein at least a portion of said sealant mass is applied in step (b) intermediate said body edge and said lamina end.

13. The method of claim 1 wherein said body and said lamina each have second ends, said second lamina end extending substantially beyond said second body end, and including the additional steps of applying said sealant between said second lamina end and said second body end, and heat-shrinking said second lamina end about said second body end to seal said second body end.

14. The method of claim 1 wherein said sealant is applied in step (b) to the active exposed surface of said body end and said body edge.

15. The method of claim 14 including the step of reducing the length of said lamina end extending from said body end prior to heat-shrinking in step (c) to a length enabling said lamina end to become embedded in said sealant mass upon heat-shrinking in step (c).

16. The method of claim 1 wherein said body has an inner core of circular cross-section coaxially disposed therewithin, said core having an end extending beyond said body end, and wherein said sealant is applied in step (b) to the entire surface of said body end between said core end and said lamina end.

17. The method of claim 16 including the step of reducing the length of said lamina end extending from said body end prior to heat-shrinking in step (c) to a length enabling said lamina end to become embedded in said sealant mass upon heat-shrinking in step (c) intermediate said core end and said body edge.

18. The method of claim 1 wherein said lamina end, after heat-shrinking in step (c), is appreciably spaced from the radially inner end of said sealant mass.

19. The method of claim 15 wherein said body end defines an arcuately beveled outer edge.

* * * * *